United States Patent [19]

Kendall et al.

[11] Patent Number: 5,034,445
[45] Date of Patent: Jul. 23, 1991

[54] STABILIZED POLYSILOXANE FLUIDS AND A PROCESS FOR MAKING SAME

[75] Inventors: Steven S. Kendall, Davison; Charles Piskoti, Grand Blanc, both of Mich.

[73] Assignee: Genesee Polymers Corporation, Flint, Mich.

[21] Appl. No.: 587,542

[22] Filed: Sep. 21, 1990

Related U.S. Application Data

[63] Continuation of Ser. No. 357,983, May 26, 1989, abandoned.

[51] Int. Cl.$^5$ .................................................. C08K 5/24
[52] U.S. Cl. ..................................... 524/265; 524/447; 525/476; 556/401
[58] Field of Search ................ 525/476; 524/265, 447; 556/401

[56] References Cited

U.S. PATENT DOCUMENTS

| | | | |
|---|---|---|---|
| 2,960,492 | 11/1960 | Morton | 528/12 |
| 3,018,262 | 1/1962 | Schroeder | 427/386 |
| 3,117,099 | 1/1964 | Proops | 528/361 |
| 3,346,405 | 9/1967 | Viventi | 106/14.41 |
| 3,388,144 | 6/1968 | Musolf | 556/427 |
| 3,714,213 | 1/1973 | Miller | 556/451 |
| 3,819,563 | 6/1974 | Takago | 524/449 |
| 3,826,669 | 7/1974 | Antlfinger | 106/287.18 |
| 4,029,827 | 6/1977 | Imperial | 427/14.1 |
| 4,046,795 | 9/1977 | Martin | 556/429 |
| 4,046,930 | 9/1977 | Johnson | 427/387 |
| 4,230,632 | 9/1980 | Chapman | 556/401 |
| 4,251,277 | 2/1981 | Martin | 106/38.22 |
| 4,256,828 | 3/1981 | Smith | 522/31 |
| 4,279,717 | 7/1981 | Eckberg | 522/31 |
| 4,318,939 | 3/1982 | Wong | 427/96 |
| 4,366,001 | 12/1982 | Ona et al. | 106/287.14 |
| 4,460,726 | 7/1984 | Huber et al. | 556/401 |
| 4,588,771 | 4/1986 | Manis | 524/731 |
| 4,612,055 | 9/1986 | Manis | 106/287.11 |
| 4,622,412 | 11/1986 | Piskoti | 556/429 |
| 4,644,074 | 2/1987 | Manis | 556/401 |
| 4,720,515 | 1/1988 | Iji et al. | 525/476 |
| 4,732,932 | 3/1988 | Waldern | 524/265 |
| 4,851,481 | 7/1989 | Kuriyama et al. | 525/476 |
| 4,859,722 | 8/1989 | Shiobara et al. | 525/476 |
| 4,877,822 | 10/1989 | Itoh et al. | 525/476 |
| 4,880,882 | 11/1989 | Morita et al. | 525/476 |

*Primary Examiner*—Melvyn I. Marquis
*Attorney, Agent, or Firm*—James C. McLaughlin

[57] ABSTRACT

Organopolysiloxane fluids, thiofunctional polysiloxane fluids, or blends of organopolysiloxane fluids and thiofunctional polysiloxane fluids are stabilized against degradation in the presence of kaolin clays at elevated temperatures by adding an epoxy containing compound.

10 Claims, No Drawings

STABILIZED POLYSILOXANE FLUIDS AND A PROCESS FOR MAKING SAME

This is a continuation of co-pending application Ser. No. 357,983, filed May 26, 1989, now abandoned.

TECHNICAL FIELD OF THE INVENTION

The present invention relates to polysiloxane fluids that are resistant to clay induced degradation, and more particularly to stabilizing polysiloxane fluids against degradation in the presence of acid clays at elevated temperature.

The polysiloxane fluids rendered more stable to clay induced degradation in the present invention include organopolysiloxane fluids, thiofunctional polysiloxane fluids or blends of organopolysiloxane fluids and thiofunctional polysiloxane fluids.

BACKGROUND INFORMATION

Polysiloxane fluids may be prepared using acid clays as catalysts to effect the necessary breaking and reforming of siloxane bonds to attain linear fluid polymers from mixtures of cyclic organopolysiloxanes, endblocking hexalkyldisiloxane and any added linear polysiloxane oligomers. For example, U.S. Pat. No. 4,622,412, discloses the use of acid clay catalyst (Filtrol 13, available from Filtrol Corporation) to form a mercaptofunctional polysiloxane fluid from lower molecular weight siloxane precursors. The use of acid clay catalysts may also be employed to breakdown or depolymerize polysiloxanes—leading to removal of volatile lower molecular weight products. U.S. Pat. No. 3,714,213 (Miller) for example, teaches the use of acid treated clay or synthetic alumina silicate as cracking catalysts to convert methyl hydrogen polysiloxane fluid to volatile methyl hydrogen cyclic polysiloxanes.

When silicone fluids are used as release agents in electrostatic copying machines to effect release of toner treated paper from the heated fuser roll, substantial contamination of the fluid by acidic kaolin clay is incurred. According to U.S. Pat. Nos. 4,588,771, 4,612,055 and 4,644,074 this contamination is caused by the presence of kaolin clay in the paper, which collects in the copying machine sump along with excess release agent. When the sump contents are reused, the combination of acidic kaolin clay and the high temperature of the fuser roll results in breakdown to lower molecular weight silicone products. The content of kaolin clay varies in paper stocks, along with the degree of dusting of paper fines, giving variations in silicone release agent performance that are related to paper stock. Various makes and models of copying machines also employ different fuser roll temperatures, with higher temperatures exacerbating the degrading effects of kaolin clay contamination of silicone fluid release agents.

Degradation of silicone release agents leads to a loss of copying machine efficiency as evidenced by poor release, buildup of residue on fuser rolls and evolution of siloxane volatiles, which can inhibit proper functioning of electrical switch contacts in the machines—due to the insulating properties of the silicone degradation products.

U.S. Pat. Nos. 4,588,771, 4,612,055, and 4,644,074 disclose the use of an amine containing compound as an inhibitor to degradation in kaolin clay containing organopolysiloxanes, or thiofunctional polysiloxane fluids, or blends of organopolysiloxane fluids with thiofunctional polysiloxane fluids.

Despite the cited stability improvements of these silicones (modified by the addition of amine compound) in the presence of kaolin clay and heat, a need still exists for improved products that do not require potentially hazardous or corrosive amine compounds for stability enhancement.

The organic amine compounds disclosed in U.S. Pat. Nos. 4,588,771, 4,612,055 and 4,644,074 are, in some instances, toxic materials that might present safety problems when used in copier machine release agents. 4,4'-bis (alpha-methylbenzyl) diphenyl amine (BDPA), disclosed in example 1 of each of the above three patents, is a member of the diarylamine family of amine compounds.

According to the *Encyclopedia of Chemical Technology* by Kirk-Othmer, Third Edition, Vol. 2, Pg. 335, anthramine (a higher diarylamine) has been found to cause tumors in mice and rats. This same reference book, on page 334, states that both DuPont and BF Goodrich ceased production of another diarylamine (N-phenyl-B-naphthylamine) "because it metabolizes in the body to produce small amounts of 2-naphthylamine, a known carcinogen."

The *Hazardous Chemicals Desk Reference* by Sax and Lewis (Published by VanNostrand Reinhold Company - Copyright 1987) lists diphenylamine as an experimental teratogen and a poison by ingestion on page 449.

This same reference book, on page 184, states: "Aromatic Amines contain one or more rings of unsaturated or cyclic hydrocarbon, such as benzene. There are a vast number of such amines. Many of these aromatic amines are recognized as carcinogenic to the human bladder, ureter, and renal pelvis, and carcinogenic to the intestines, lung, liver and prostrate."

This same reference also states, on page 145, that amines, in general, range from poisons to slightly toxic compounds. Many are considered to be skin irritants and some are sensitizers.

In addition to the potential health hazards of amine compounds, the corrosive nature of many amines further demonstrates the need for an improved additive for silicone release agents used in copying machines.

U.S. Pat. No. 3,819,563 discusses negative effects of amines evolved from room temperature vulcanizing silicone compositions stating that: "Amines, along with acids and oximes, generate poisonous or corrosive gases which may corrode metallic substrates."

U.S. Pat. No. 4,318,939 discusses corrosiveness of amines, especially when used in electronic devices. Column 4, lines 50–57 states: "Furthermore, amines are corrosive to certain metals such as aluminum which is often present in electronic devices. Hence, when the formulation is employed as an encapsulant for electronic devices, the use of amine must be avoided."

Therefore, it is the object of this invention to provide amine compound-free stabilized siloxane fluids. Another object is to provide a process for stabilizing organopolysiloxane fluids, thiofunctional polysiloxane fluids or blends of organopolysiloxane fluids and thiofunctional polysiloxane fluids against degradation in the presence of kaolin clay, without the use of potentially hazardous or corrosive amine compound additives. A further object of this invention is to obtain the above improvements without significantly affecting the properties of the silicone fluids, except for improved resistance to degradation induced by kaolin clay.

SUMMARY OF THE INVENTION

The foregoing objects, and others which will become apparent from the following description, are accomplished in accordance with this invention by providing organopolysiloxane fluids, thiofunctional polysiloxane fluids or blends of organopolysiloxane fluids and thiofunctional polysiloxane fluids that are stable in the presence of kaolin clay. The process of achieving enhanced stability comprises mixing epoxy containing compounds with the above fluids in levels of from 0.001 to 50 percent by weight based on the weight of the epoxy containing compound and the organopolysiloxane fluid, thiofunctional polysiloxane fluid or blend of organopolysiloxane fluid and thiofunctional polysiloxane fluid.

DETAILED DESCRIPTION OF THE INVENTION

The organopolysiloxane fluids employed in this invention have recurring units of the general formula

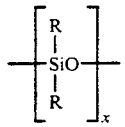

where the R(s), which may be the same or different, represent monovalent hydrocarbon radicals having from 1 to 18 carbon atoms or halogenated monovalent hydrocarbon radicals having from 1 to 18 carbon atoms; the terminal groups are selected from the group consisting of triorganosiloxy, alkoxy, and hydroxy groups; and X is a number greater than or equal to two.

Suitable examples of monovalent hydrocarbon radicals represented by R are: alkyl radicals, such as methyl, ethyl, propyl, butyl, octyl, dodecyl, and octadecyl radicals; aryl radicals, such as phenyl and naphthyl radicals; alkenyl radicals, such as vinyl and allyl radicals; cycloalkyl radicals, such as cyclobutyl, cyclopentyl and cyclohexyl radicals; alkaryl radicals, such as tolyl, xylyl, and ethylphenyl radicals; and aralkyl radicals, such as α-phenylethyl, β-phenylethyl and α-phenylbutyl radicals.

Examples of halogenated monovalent hydrocarbon radicals are: haloalkyl radicals, such as 3,3,3-trifluoropropyl radical and haloaryl such as o-, m-, p-chlorophenyl radicals.

Any linear, branched or cyclic organopolysiloxanes having an average of from 1.75 to 2.25 organic radicals per silicon atom may be employed in this invention. It is preferred that the polyorganosiloxanes have a viscosity of between about 5 and 1,000,000 mPa.s at 25° C. and more preferably between about 50 and 300,000 mPa.s at 25° C. Also, it is possible to combine high and low viscosity fluids to form a fluid having the desired viscosity.

Examples of suitable organopolysiloxanes are: trialkylsiloxy endblocked diorganopolysiloxanes, such as trimethylsiloxy-endblocked dimethylpolysiloxanes and triethylsiloxy endblocked-diethylpolysiloxanes; alkenyl terminated diorganopoly-siloxanes, such as vinyl-endblocked dimethylpolysiloxanes, diethyl-polysiloxanes, and dipropylpolysiloxanes; and copolymers having dimethylsiloxane units and diphenyl siloxane units or methylphenyl siloxane units and dimethylsiloxane units. Preferably, the organopolysiloxanes are trimethylsiloxy-endblocked dimethylpolysiloxanes.

Thiofunctional polysiloxane fluids suitable for use in the current invention include: thio-alkyl substituted dialkyl polysiloxane fluids that may have branched, linear, or cyclic structures. The thio-alkyl groups present in such fluids may be pendent to the polymer chains or at the ends of the fluid chains or in both pendent and end group positions. Examples of processes for making such thiofunctional polysiloxane fluids are disclosed in U.S. Pat. Nos. 4,622,412, 4,046,795, and 4,230,816.

Thiofunctional polysiloxane fluids preferred in this invention are described in U.S. Pat. No. 4,029,827. A typical mercapto functional polysiloxane backbone, described in U.S. Pat. No. 4,029,827, is of the dialkyl type having the general formula:

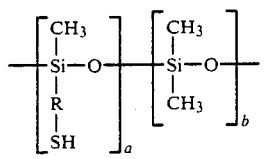

wherein R represents a "spacer" group pendant from the polymer backbone and SH is the mercapto functional group. In preferred embodiments, each R is an alkyl moiety having about 1-8 carbon atoms (such as methyl, ethyl, propyl, and butyl) and typically a propyl group ($-CH_2-CH_2-CH_2-$). For a polymer having a 1 mole percent mercapto functional group content, there is 1 a moiety for every 99 b moieties. If the mercapto functional group content is 2 mole percent, there is an average of 2 a moieties for every 98 b moieties. Furthermore, the R spacer group may be straight chain or branched. The molecule shown in the general formula above comprises methyl groups substituted on the Si atoms in non-spacer group sites. However, these non-spacer group sites may typically comprise general alkyl groups from about 1 to 18 carbons and mixtures thereof. Other groups may be substituted at these sites by one skilled in the art as long as the substituted groups do not interfere with the mercapto functional groups designated in the general formula by $-SH$. The $R-SH$ groups may be randomly positioned in the molecule to provide the functional groups in the release agents, and processes of the present invention. Alternatively, or in addition, the mercapto functional groups ($-SH$) may be located on spacer groups (R) at terminal sites on the molecule, i.e., the molecule may be "end-capped" by the mercapto functional groups.

The thiofunctional polysiloxane fluids employed in the present invention may be described as:

a thiofunctional polysiloxane fluid having the general formula

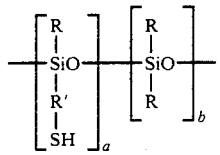

where
each R represents a radical selected from the group consisting of monovalent hydrocarbon radicals having from 1 to 18 carbon atoms, and halogenated monovalent hydrocarbon radicals having from 1 to 18 carbon atoms, each R' is bonded to the silicon atom via a silicon-carbon bond and is selected from the group consisting of a divalent hydrocarbon radical free of aliphatic unsaturation having from 2 to 18 carbon atoms, and a hydrocarbon thioether radical, a is a number greater than or equal to zero,
b is a number greater than or equal to zero, and
the terminal groups are selected from the group consisting of triorganosiloxy, alkoxy, hydroxy, and

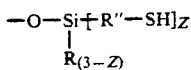

groups in which each R represents a radical selected from the group consisting of monovalent hydrocarbon radicals having from 1 to 18 carbon atoms, halogenated monovalent hydrocarbon radicals having from 1 to 18 carbon atoms, triorganosiloxy radicals, alkoxy radicals, and hydroxy radicals, R" is bonded to the silicon atom via a silicon-carbon bond and is selected from the group consisting of a divalent hydrocarbon radical free of aliphatic unsaturation having from 2 to 18 carbon atoms and a hydrocarbon thioether radical, Z equals 0, 1, 2, or 3, and
a+Z is greater than or equal to one.

Processes for the preparation of thiofunctional (mercapto) silicone fluids are disclosed in U.S. Pat. Nos. 4,622,412, 4,046,795, 3,346,405, 2,960,492, and 3,388,144.

Blends of thiofunctional polysiloxane fluids and organopolysiloxanes are discussed in U.S. Pat. Nos. 4,251,277 and 4,612,055. It has been found that in some instances blends of these two compositions give better release performance in electrostatic copying machines than when either fluid is used separately.

Epoxy containing compounds employed as stabilizing agents in this invention include both organic epoxy compounds and epoxy containing silane or polysiloxane compositions. The epoxy containing organic compounds have at least one oxirane ring

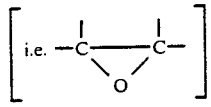

present.

Such materials, broadly called epoxies, include monomeric epoxy compounds and epoxides of the polymeric type and can be aliphatic, cycloaliphatic, aromatic or heterocyclic. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of molecules present.

These epoxy-containing materials may vary from low molecular weight monomeric materials to high molecular weight polymers and may vary greatly in the nature of their backbone and substitutable groups. For example, the backbone may be of any type and substitutable groups thereon can be any group free of an active hydrogen atom that is reactive with an oxirane ring at room temperature. Illustrative of permissible substitutable groups are: halogens, ester groups, ethers, sulfonate groups, nitro groups, phosphate groups, etc. The molecular weight of the epoxy-containing materials may vary from 58 to about 100,000 or more. Mixtures of various epoxy-containing materials can also be used in the compositions of this invention.

Useful epoxy-containing materials include those that contain cyclohexene oxide groups, such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4)-epoxy-6-methylcyclohexylmethyl) adipate. For a more detailed list of useful epoxides of this nature, reference is made to U.S. Pat. No. 3,117,099, incorporated herein by reference.

Further epoxy-containing materials that are particularly useful in the practice of this invention include glycidyl ether monomers of the formula

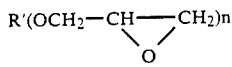

where R' is alkyl or aryl and n is an integer of 1 to 6. Examples are glycidyl ethers of polyhydric phenols obtained by reacting a polyhydric phenol with an excess of chlorohydrin such as epichlorhydrin (e.g., the diglycidyl ether of 2,2-bis-(2,3-epoxypropoxyphenol)-propane). Further examples of epoxides of this type that can be used in the practice of this invention are described in U.S. Pat. No. 3,018,262, incorporated herein by reference, and in *Handbook of Epoxy Resins* by Lee and Neville, McGraw-Hill Book Co., New York (1967).

There are a host of commercially available epoxy-containing materials that can be used in this invention. In particular, readily available epoxides that may be used include: octadecylene oxide, epichlorohydrin, styrene oxide, vinyl cyclohexene oxide, glycidol, glycidylmethacrylate, diglycidyl ether of Bisphenol A (e.g., those available under the trade designations "Epon 828," "Epon 1004" and "Epon 1010" from Shell Chemical Co., and "DER-331," "DER-332" and "DER-334" from Dow Chemical Co.), vinylcyclo- hexene dioxide (e.g., "ERL-4206" from Union Carbide Corp.), 3,4-epoxycyclohexylmethyl-3,4epoxycyclohexene carboxylate (e.g., "ERL-4221" from Union Carbide Corp.), 3,4-epoxy-6-methylcyclohexylmethyl-3,4-epoxy-6-methylcyclohexene carboxylate (e.g., "ERL-4201" from Union Carbide Corp.), bis (3,4-epoxy-6-methylcyclohexylmethyl) adipate (e.g., "ERL-4289" from Union Carbide Corp.), bis(2,3-epoxycyclopentyl) ether (e.g., "ERL-0400" from Union Carbide Corp.), aliphatic epoxy modified with polypropylene glycol (e.g., "ERL-4050" and "ERL-4052" from Union Carbide Corp.), dipentene dioxide (e.g., "ERL-4269" from Union Carbide Corp.), epoxidized polybutadiene (e.g., "Oxiron 2001" from FMC Corp.), flame retardant epoxy resins (e.g., "DER-580," a brominated bisphenol type epoxy resin, available from Dow Chemical Co.), 1,4 butanediol diglycidyl ether of phenolformaldehyde novolak (e.g., "DEN-431" and "DEN-438" from Dow Chemical Co.), and resorcinol diglycidyl ether (e.g., "Kopoxide" from Koppers Company, Inc.).

Still other epoxy-containing materials that may be used in the present invention are: copolymers of acrylic acid esters or glycidol, such as glycidylacrylate and glycidylmethacrylate with one or more copolymerizable vinyl compounds. Examples of such copolymers are: 1:1 styrene-glycidylmethacrylate, 1:1 methylmethacrylate-glycidylacrylate and a 52.5:24:13.5 methylmethacrylate-ethylacrylateglycidylmethacrylate.

Epoxy containing silicone polymers suitable for use in this invention have been used for rendering paper and textile fabric substrates water repellent as disclosed in U.S. Pat. No. 4,046,930.

Epoxy silicone polymer compositions suitable as stabilizers in the current invention may be selected from the group consisting of epoxy containing linear, branched, or cyclic polysiloxanes.

Epoxy silicone polymer compositions suitable and preferred as stabilizers in the current invention are represented by the formula $$MD_xU_yM_q'$$  Formula I wherein D represents an $R_2SiO$ unit in which R is a monovalent hydrocarbon radical; each U represents a unit selected from the class consisting of:

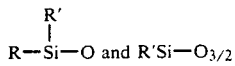

in which R is defined above and R' is a monovalent organic radical containing at least one vicinal epoxy group.

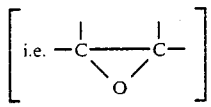

M and M' are in each occurrence an end blocking unit having the formula:

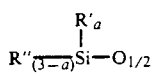

in which R" is a monovalent hydrocarbon radical free of olefinic unsaturation, R' is as defined above, a has a value from 0 to 3 inclusive, q has a value of 1 when U is an

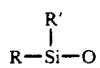

unit and a value of (y+1) when U is an

unit, x is an integer having a value of from 10 to about $10^5$, y is a integer having a value of 1 to $10^2$, the sum of x, y, and q being such that the epoxy-silicone compound $MD_xU_yM'_q$ has a molecular weight of from $10^3$ to about $10^6$.

Illustrative of the monovalent hydrocarbon radicals represented by R in the $R_2SiO$ and

units defined above for U are: alkyl groups containing from 1 to 18 carbon atoms, preferably 1 to 5 carbon atoms, such as methyl, ethyl, propyl, butyl, isobutyl, amyl, hexyl, octyl, and decyl; alkenyl groups, such as vinyl, allyl, butadienyl, 1-pentenyl and the like; aryl radicals including fused ring structures, such as phenyl, p-phenylphenyl, naphthyl, anthryl and the like; alkaryl radicals, such as tolyl, xylyl, p-vinyphenyl, β-methylnaphthyl, and the like; arylalkyl radicals, such as stearylphenyl methyl and phenylcyclohexyl; and cycloalkyl radicals, such as cyclopentyl, cyclohexyl and cyclobutyl. Preferred R radicals are alkyl, with methyl being particularly preferred.

The monovalent organic radicals represented by R' that contain epoxy groups are, exclusive of the oxirane oxygen necessarily present, preferably hydrocarbon radicals free of acetylenic unsaturation or containing, in addition to carbon and hydrogen, only ether or carbonyl oxygen. Such R' radicals include: 3,4-epoxycyclohexyl, 6-methyl-3,4-epoxycyclohexyl' 6-methyl-3,4-epoxycyclohexyl, 3-oxatricyclo-octane-6-propyl, 7-butyl-3-oxatricyclo-octane-6-methyl, 3,4-epoxy- cyclohexyl-1-ethyl, 9,10-epoxystearyl, 3-glycidoxypropyl, p-(2,3-epoxybutyl)phenyl, and 3-(2,3-epoxybutyl)-cyclohexyl. The vicinal epoxy group can be, but need not be, a terminal group of the R' radical. Moreover, the R' radical can be simply a radical directly joined to silicon. A variety of epoxy silicones are illustrated structurally and further characterized with respect to physical properties in Journal of American Chemical Society, Vol. 81, at pages 2632–2635, E. P. Plueddemann et al.

Because of ready availability of precursors, and the excellent results obtained using the final product, the preferred units of Formula I above are: $M=M'=(CH_3)_3SiO_{1/2}$ and $D=(CH_3)_2SiO$. More particularly preferred are the silicones containing these M and D units in combination with at least one U unit of the formula:

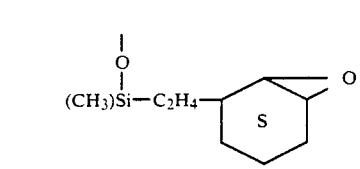

or

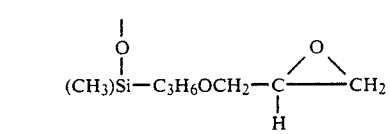

which polymers have the structure $$MD_xU_yM$$

wherein y is an integer having a value of from about 1 to about 15 and x is an integer having a value of from about 10 to 500.

The aforesaid silicones are well known in the art and can conveniently be prepared, among other methods, by the platinum catalyzed addition of aliphatically unsaturated epoxy compounds to hydrosiloxanes, the ratio of reactants being such as to prevent the presence of more than trace amounts of residual hydrosiloxane groups following the reaction. By trace of hydrogensiloxane is meant not more than that amount which will produce about 2 cc. hydrogen per gram of silicone by the NaOH gas evolution method.

In addition to the use of organic epoxy compounds and epoxy containing silicone polymers, it is also possible to achieve improved stabilization of silicone polymers to kaolin clay induced degradation by the addition of epoxy containing silane compounds in the present invention. These additives include β(3,4-epoxycyclohexyl) ethyltrimethoxysilane, 3-glycidoxypropylmethyldiethoxy silane and 3-glycidoxypropyltrimethoxy silane.

The amount of epoxy containing compound that may be added to organopolysiloxane fluids, thiofunctional polysiloxane fluids or blends of organopolysiloxane fluids and thiofunctional polysiloxane fluids to prevent degradation in the presence of kaolin clay may range from 0.001 up to about 50 percent by weight, and more preferably from about 0.1 to about 10 percent, based on the weight of the blend of epoxy containing compound and silicone fluid comprising organopolysiloxane fluids or thiofunctional polysiloxane fluids or blends of organopolysiloxane fluids and thiofunctional polysiloxane fluids.

Addition of epoxy containing compounds to silicone fluids to prepare the compositions of this invention may be generally made at room temperature, followed by simple mixing to insure homogeneity. It is preferable, but not essential, that the epoxy containing compounds be compatible with organopolysiloxanes, thiofunctional polysiloxanes or blends of organopolysiloxanes and thiofunctional polysiloxanes. Improved stability of the finished compositions is attained in the presence of acid clays even when the mixtures are not compatible, although in some cases continuous or intermittent mixing may be required to satisfy the particular demands of applications such as release agents used in electrostatic copying machines.

The mixtures of silicone fluids (consisting of organopolysiloxanes, thiofunctional polysiloxanes, or blends of organopolysiloxanes and thiofunctional polysiloxanes) with epoxy containing compounds may be used as release agents in electrostatic copying machines, where the mixtures come into contact with clay containing paper at elevated temperatures. The epoxy containing compound acts as a buffering agent against the acidic clay, significantly reducing volatilization of the silicone release agent and greatly reducing any tendency of the silicone fluid to gel over extended periods of operation.

In the following examples, which will serve to illustrate the present invention, all parts are by weight, and all percentages are given as percentages by weight, unless otherwise indicated.

PREPARATION OF THIOFUNCTIONAL POLYSILOXANE FLUIDS

The thiofunctional polysiloxane fluid, used in several examples below, was prepared in accordance with U.S. Pat. No. 4,622,412, per the following procedure.

(A) A suitable reaction vessel (equipped with heating means, agitation means, and a reflux condenser) is charged with 30.0 parts of methyl-3-mercaptopropyl-dimethoxysilane, 120.0 parts of dimethyldiethoxysilane, 150 parts of distilled water and 1.0 part of glacial acetic acid. With stirring, the reactants are heated at a reflux temperature of 50° C. and held there for 30 minutes. The cohydrolysis product obtained is a single phase, clear liquid.

A second suitable reaction vessel (equipped with heating means, stirring means, thermometer, Dean Stark trap and an addition funnel) is charged, under a nitrogen blanket, with 1160.0 parts of octamethylcyclotetrasiloxane, 27.0 parts of hexa- methyldisiloxane, 116.0 parts of heptane and 10.0 parts of FILTROL 13 acid clay catalyst. With stirring, the reactants are heated to a reflux temperature of 145° C. and held there.

The cohydrolysis product obtained hereinabove is slowly added to the second vessel over a 180 minute period. The temperature in the vessel drops to about 110° C. and is brought back up to reflux at 145° C. The reaction is continued until the alcohol and water are removed by distillation (through the Dean Stark trap) after about 180 minutes. The product is then cooled to room temperature, filtered through a Buchner funnel, and vacuum stripped, at about one torr, for 120 minutes at 185° C.

There is obtained a clear, water-white fluid.

Viscosity of the resulting fluid is 150 cstks. at 77° F. with one percent of -SH. Theoretical structure is:

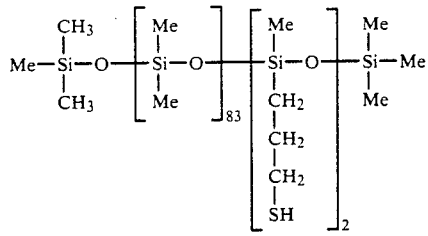

PREPARATION OF EPOXY FUNCTIONAL POLYSILOXANE FLUIDS

The most preferred epoxy containing compounds useful in this invention are 3-glycidoxypropyl substituted dimethylpolysiloxanes prepared as follows:

(B) An epoxy functional dimethyl silicone fluid is prepared by initially preparing a dimethyl, methyl hydrogen copolymer as follows: 450.9 parts of octamethylcyclotetrasiloxane is combined with 24.4 parts of Me$_3$SiO(SiMeHO)$_{40}$SiMe$_3$, 8.75 parts Me$_3$SiOSiMe$_3$ and 5.0 parts acid clay catalyst (Filtrol #13 from Filtrol Corp.). The mixture is then heated with mixing, under a nitrogen atmosphere, to 100° C. and held for 4 hours to effect equilibration. The reaction product is then cooled to room temperature and filtered to remove the acid clay catalyst. Finally, the filtered dimethyl, methyl hydrogen copolymer is stripped at 150° C. and about one torr for 4 hours to remove volatiles. The finished copolymer (404.75 parts) is then mixed with 115.5 parts xylene, 41.75 parts allyl glycidyl ether, 4.5 parts 1-dodecene and 0.0485 parts of a 5% solution of H₂PtCl₆.6H₂ in anhydrous isopropyl alcohol and heated about 4 hours at 80°-100° C. until the allyl glycidyl ether has reacted with ≡SiH. The final product is then stripped at 150° C. and about one torr for 4 hours to yield an epoxy functional silicone fluid with structure:

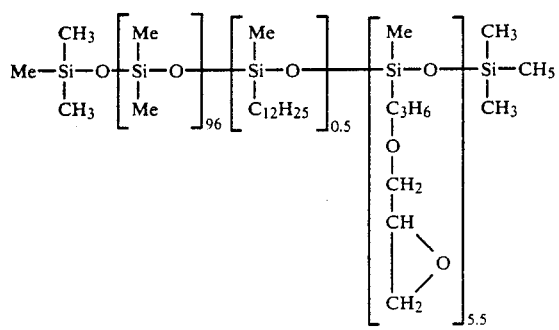

a viscosity of 410 cstks. at 77° F., and the appearance of a clear colorless liquid. Equivalent weight per epoxy group was found by analysis to be 1560 versus 1515 by calculation from the theoretical formula.

Other epoxy containing compounds tested, with results shown in the examples, are:

Epoxy Silicone Fluid (C) with structure

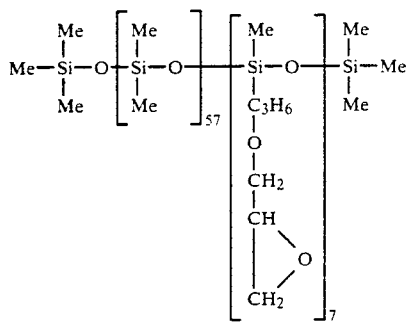

Araldite CY-179 (Giba Geigy)

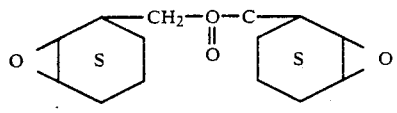

Bakelite ERL-4206 (Union Carbide)

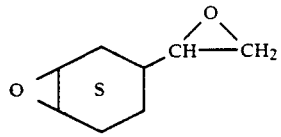

Bakelite ERL-4234 (Union Carbide)

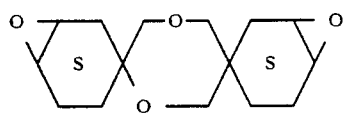

3-Glycidoxypropyl, methyldiethoxysilane
(Petrarch Systems, Inc.)

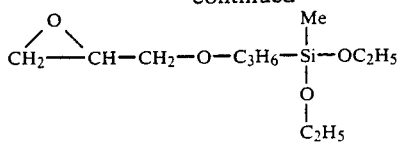

L-9300 Silicone Fluid (Union Carbide)
Claimed to be an Epoxy Reactive Silicone Fluid (8000 cstks) by manufacturer.

T-29 Silicone Fluid (Union Carbide)
Claimed to be an Epoxy Reactive Silicone Fluid (700 cstks) by manufacturer.

TEST PROCEDURE

In all examples, a mixture of 5 parts of test silicone fluid and 1 part of kaolin clay was made up. 10 grams of the fluid clay mixture was then placed in an aluminum weighing dish and then placed in a convection heating oven for times and temperatures prescribed. Change in sample weight (weight loss) was measured and percent volatiles evaporated from each fluid/clay mixture was then calculated.

Two suppliers' kaolin clay samples (such clays are used in the manufacture of paper) were tested. Testing showed RT Vanderbilt's Dixie Clay ® to be more deleterious to silicone fluids tested than Aldrich Chemical's kaolin clay.

EXAMPLE 1

A blend of 98.5 parts of 350 cstks Trimethylsiloxy endblocked dimethylpolysiloxane fluid and 1.5 parts of epoxy-functional fluid (B), prepared as described above, were tested by combining and mixing the two substances, then adding 1 part kaolin clay (Aldrich Chemical) per 5 parts of the silicone fluid with epoxy mixture.

Aluminum weighing dishes containing 10 grams of fluid-clay mixture were then placed in 105° C., 150° C. and 200° C. ovens for 24 hours, and percent volatiles recorded for each sample at the end of the test period.

For comparison purposes, tests for volatility of the trimethylsiloxy dimethylpolysiloxane fluid with no epoxy were also run. Table I shows the results.

TABLE I

| Ex. Number | (Parts) Dimethyl Silicone 350 cstks | (Parts) Epoxy Fluid (B) | Vols. % 24 Hrs. 105° C. | Vols. % 24 Hrs. 105° C. | Vols. % 24 Hrs. 200° C. |
|---|---|---|---|---|---|
| (a) | 100 | — | 0.26 | 3.13 | 39.84 |
| (b) | 98.5 | 1.5 | 0.12 | 0.21 | 12.58 |

Although not shown on Table I, with no clay added, percent volatiles was less than 0.25%, after 24 hours at 200° C., for both the 350 cstks dimethylpolysiloxane fluid alone and with epoxy silicone (B) added.

EXAMPLE 2

A mixture of 90 parts 350 cstks trimethylsiloxy dimethylpolysiloxane and 10 parts thiofunctional fluid (A), prepared as described above, was tested for stability in the presence of kaolin clay with varying amounts of epoxy silicone (C), described above. Each test fluid was tested at 5 parts fluid mixed with 1 part kaolin clay (Aldrich Chemical), with 10 grams of clay fluid mixture placed in an aluminum dish and held in a 200° C. oven for 24 hours.

Table II presents results

TABLE II

| EXAMPLE NUMBER | 90/10 Blend Dimethyl Fluid + Mercapto Fluid (A) (Parts) | Epoxy Silicone (C) (Parts) | After 24 Hrs. at 200° C. % |
|---|---|---|---|
| (c) | 100 | — | 18.12% |
| (d) | 99.5 | 0.5 | 11.48% |
| (e) | 99 | 1.0 | 5.17% |
| (f) | 98.5 | 1.5 | 2.6% |

In the absence of clay, all fluid blends above have less than 0.25% volatiles through the same test period.

EXAMPLE 3

The test procedure of Example 2 was carried out, but epoxy fluid (B) was used in place of epoxy fluid (C).
Table III presents results:

TABLE III

| Example Number | 90/10 Blend 350 cstks Dimethyl Fluid + Mercapto Fluid (A) (Parts) | Epoxy Sil. (B) (Parts) | Volatility After 24 Hrs at 200° C. % |
|---|---|---|---|
| (g)[1] | 99.5 | 0.5 | 4.02% |
| (h) | 99 | 1.0 | 4.8% |
| (i)[2] | 98.5 | 1.5 | 1.72% |

[1] The mole concentration of epoxy groups, in this example, is about 0.03. The Epoxy Equivalent Weight (EEW), as defined on page 4-14 of Handbook of Epoxy Resins by Lee and Neville, McGraw-Hill Book Co., New York (1967), is about 300,000. Said definition of EEW is hereby incorporated by reference.
[2] This example is the same as the preferred embodiment of the present invention.

EXAMPLE 4

A number of epoxy containing compounds were tested in the 90/10 blend of 350 cstks trimethylsiloxy dimethyl polysiloxane and thiofunctional fluid prepared in (A). Test procedure was as given in previous examples.

Table IV presents results: Structure and manufacturer of the epoxy containing compounds was discussed above.

TABLE IV

| Example Number | 90/10 Blend 350 cs. Dimethyl Fluid and Mercapto (Parts) | Epoxy Compound (Parts) | Volatiles % After 24 Hours-200° C. |
|---|---|---|---|
| (j) | 100 | — | 18.12% |
| (k) | 98.5 | CY-179(1.5) | 1.01% |
| (l) | 98.5 | ERL-4206(1.5) | 1.56% |
| (m) | 98.5 | ERL-4234(1.5) | 1.09% |
| (n) | 98.5 | *Epoxy Silane (1.5) | 1.65% |
| (o) | 98.5 | L-9300 (1.5) | 15.39% |
| (p) | 98.5 | T-29 (1.5) | 6.62% |

*3-Glycidoxypropyl methyl diethoxysilane

EXAMPLE 5

The thiofunctional fluid (A), prepared as described above, was tested for stability in the presence of kaolin clay when mixed with varying amounts of epoxy functional fluid (B), prepared as described above. Each test was run in the same manner as in the above examples, using kaolin clay from Aldrich Chemical. Table V shows results:

TABLE V

| EXAMPLE NUMBER | Thiofunctional Fluid (A) (Parts) | Epoxy Silicone Fluid (B) (Parts) | Volatility After 24 Hrs. at 200° C. |
|---|---|---|---|
| (q) | 100 | — | 34.57% |
| (r) | 99.5 | 0.5 | 15.21% |
| (s) | 99 | 1.0 | 10.67% |
| (t) | 98.5 | 1.5 | 3.44% |

In the absence of clay, all test samples in example 5 have less than 0.5% volatiles at the end of 24 hours at 200° C.

EXAMPLE 6

RT Vanderbilt's Dixie Clay ® kaolin clay was used in this example in place of Aldrich Chemical's clay. A mixture of 90 parts of 350 cstks trimethylsiloxy endblocked dimethylpolysiloxane fluid and 10 parts thiofunctional polysiloxane fluid (A), prepared as described above, was tested for stability, in the presence of the Vanderbilt clay, with and without the inclusion of epoxy functional fluid (B) as a stabilizer. Each fluid was tested at a ratio of 5 parts fluid to 1 part clay, with 10 grams of fluid/clay mixture placed in an aluminum weighing dish and held for 5 hours and 16 hours at 200° C. Table VI shows the results:

TABLE VI

| Example Number | 90/10 Blend 350 cstks Dimethyl Fluid + Mercapto Fluid (A) (Parts) | Epoxy Sil. (B) (Parts) | Volatility After 5 Hrs at 200° C. | Volatility After 16 Hrs at 200° C. |
|---|---|---|---|---|
| (u) | 100 | — | 64.1% | 77.8% |
| (v) | 98.5 | 1.5 | 14.5% | 46.5% |

EXAMPLE 7

The stabilizing effect of different concentrations of epoxy functional fluid (B) mixed with 350 cstks trimethylsiloxy endblocked dimethylpolysiloxane fluid was evaluated when the mixture was combined with RT Vanderbilt's Dixie Clay ® kaolin clay. Each fluid mixture was combined with the clay in the ratio of 5 parts fluid to one part clay. Ten grams of fluid/clay combination was placed in an aluminum weighting dish and held for 3, 5, 8, and 24 hours at 200° C. Results are presented in Table VII.

TABLE VII

| EXAMPLE NUMBER | Dimethyl Silicone 350 cstks (Parts) | Epoxy Fluid (B) (Parts) | Volatiliy (%) After 3 Hrs At 200° C. | 5 Hrs | 8 Hrs | 24 Hrs |
|---|---|---|---|---|---|---|
| (w) | 100 | — | 69.94 | 71.19 | 71.89 | 73.73 |
| (x) | 98.5 | 1.5 | 19.06 | 35.00 | 75.83 | 82.04 |
| (y) | 95 | 5 | 8.54 | 11.93 | 16.38 | 38.85 |
| (z) | 90 | 10 | 4.56 | 6.65 | 9.21 | 18.98 |
| (aa) | 75 | 25 | 2.44 | 3.03 | 3.68 | 6.01 |
| (bb)[3] | 50 | 50 | 2.36 | 3.00 | 3.75 | 5.88 |

[3] The mole concentration of epoxy groups, in this example, is about 2.8. The EEW is about 3,000. EEW is defined in footnote 1 on page 22.

What is claimed is:
1. A composition stabilized against the degrading effects of kaolin clay comprising: a mixture of
(a) a fluid, wherein said fluid is

(i) a thiofunctional polysiloxane fluid having branched, linear, or cyclic structure with the general formula

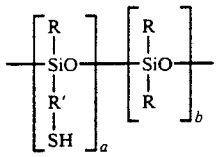

where each R represents a radical selected from the group consisting of monovalent hydrocarbon radicals having from 1 to 18 carbon atoms, and halogenated monovalent hydrocarbon radicals having from 1 to 18 carbon atoms, p2 each R' is bonded to the silicon atom via a silicon-carbon bond and is selected from the group consisting of a divalent hydrocarbon radical free of aliphatic unsaturation having from 2 to 18 carbon atoms, and a hydrocarbon thioether radical, a is a number greater than or equal to zero, b is a number greater than or equal to zero, and the terminal groups are selected from the group consisting of triorganosiloxy, alkoxy, hydroxy, and

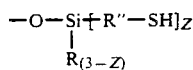

groups in which each R represents a radical selected from the group consisting of monovalent hydrocarbon radicals having from 1 to 18 carbon atoms, halogenated monovalent hydrocarbon radicals, having from 1 to 18 carbon atoms, triorganosiloxy radicals, alkoxy radicals, and hydroxy radicals, R" is bonded to the silicon atom via a silicon-carbon bond and is selected from the group consisting of a divalent hydrocarbon radical free of aliphatic unsaturation having from 2 to 18 carbon atoms and a hydrocarbon thioether radical, Z equals 0, 1, 2, or 3, and a+Z is greater than or equal to one, or (ii) a blend of said thiofunctional polysiloxane fluid; and an organopolysiloxane fluid having linear, branched or cyclic structure with recurring units of the general formula

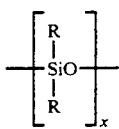

where the R(s), which may be the same or different, represent monovalent hydrocarbon radicals having from 1 to 18 carbon atoms or halogenated monovalent hydrocarbon radicals having from 1 to 18 carbon atoms; the terminal groups are selected from the group consisting of triorganosiloxy, alkoxy, and hydroxy groups; and X is a number greater than or equal to two; and (b) an epoxy containing compound that contains at least one vicinal epoxy group represented by

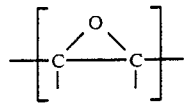

per molecule in levels of from 0.001 to 50 percent by weight based on the weight of said epoxy containing compound and said thiofunctional polysiloxane fluid or blend of said organopolysiloxane fluid and said thiofunctional polysiloxane fluid;

wherein said epoxy containing compound is selected from the group consisting of epoxy containing silanes and epoxy containing siloxanes.

2. A composition as recited in claim 1, wherein said epoxy containing compound supplies sufficient epoxy groups that said mixture has an epoxy equivalent weight of about 3,000 or more.

3. A composition as recited in claim 1, wherein said epoxy containing compound supplied sufficient epoxy groups that said mixture has an epoxy equivalent weight of between about 3,000 and about 300,000.

4. A composition as recited in claim 1, wherein said organopolysiloxane fluid is a trimethylsiloxy endblocked dimethyl polysiloxane fluid.

5. A composition as recited in claim 1, wherein said thiofunctional polysiloxane fluid is a 3-mercaptopropyl substituted trimethylsiloxy dimethylpolysiloxane fluid.

6. A composition as recited in claim 1, wherein said epoxy containing compound is an epoxy containing silicone polymer compound represented by the formula $MD_xU_yM_q'$ where D represents an $R_2SiO$ unit in which each R is a monovalent hydrocarbon radical;

where each U represents a unit selected from the class consisting of

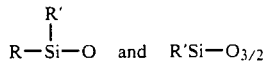

in which R is a monovalent hydrocarbon radical, and

R' is a monovalent organic radical containing at least one vicinal epoxy group represented by

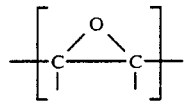

where M and M' are in each occurrence an endblocking unit having the formula

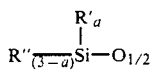

in which R" is a monovalent hydrocarbon radical free of olefinic unsaturation,

R' is a monovalent organic radical containing at least one vicinal epoxy group represented by

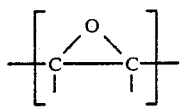

a has a value of 0, 1, 2, or 3
q has a value of 1 when U is an

unit and a value of (y+1) when U is an $R'SiO_{3/2}$ unit,
x is an integer of from 10 to about $10^6$, and
y is an integer having a value of 1 to about $10^2$; and
where the sum of x, y and q is such that such that said epoxy containing silicone polymer compound $MD_xU_yM_q'$ has a molecular weight of from $10^3$ to $10^6$.

7. A composition as recited in claim 1, wherein said epoxy containing compound is 3-glycidoxypropyltrimethoxysilane.

8. A composition as recited in claim 1, wherein said epoxy containing compound is 3-glycidoxypropyl methyl diethoxysilane.

9. A process for producing a composition stabilized against the degrading effects of kaolin clay comprising the step of: mixing a fluid, wherein said fluid is
a thiofunctional polysiloxane fluid having branched, linear, or cyclic structure with the general formula

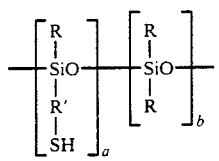

each R represents a radical selected from the group consisting of monovalent hydrocarbon radicals having from 1 to 18 carbon atoms, and halogenated monovalent hydrocarbon radicals having from 1 to 18 carbon atoms,
each R' is bonded to the silicon atom via a silicon-carbon bond and is selected from the group consisting of a divalent hydrocarbon radical free of aliphatic unsaturation having from 2 to 18 carbon atoms, and a hydrocarbon thioether radical,
a is a number greater than or equal to zero,
b is a number greater than or equal to zero, and
the terminal groups are selected from the group consisting of triorganosiloxy, alkoxy, hydroxy, and

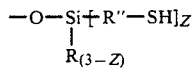

groups in which
each R represents a radical selected from the group consisting of monovalent hydrocarbon radicals having from 1 to 18 carbon atoms, halogenated monovalent hydrocarbon radicals having from 1 to 18 carbon atoms, triorganosiloxy radicals, alkoxy radicals, and hydroxy radicals,
R'' is bonded to the silicon atom via a silicon-carbon bond and is selected from the group consisting of a divalent hydrocarbon radical free of aliphatic unsaturation having from 2 to 18 carbon atoms and a hydrocarbon thioether radical,
Z equals 0, 1, 2, or 3, and
a+Z is greater than or equal to one, or
a blend of said thiofunctional polysiloxane fluid; and
an organopolysiloxane fluid having linear, branched or cyclic structure with recurring units of the general formula

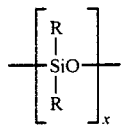

where
the R(s), which may be the same or different, represent monovalent hydrocarbon radicals having from 1 to 18 carbon atoms or halogenated monovalent hydrocarbon radicals having from 1 to 18 carbon atoms; the terminal groups are selected from the group consisting of triorganosiloxy, alkoxy, and hydroxy groups; and X is a number greater than or equal to two; and
an epoxy containing compound that contains at least one vicinal epoxy group represented by

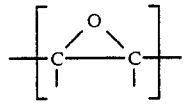

per molecule in levels of from 0.001 to 50 percent by weight based on the weight of said epoxy containing compound and said thiofunctional polysiloxane fluid or blend of said organopolysiloxane fluid and said thiofunctional polysiloxane fluid;
wherein said epoxy containing compound is selected from the group consisting of epoxy containing silanes and epoxy containing siloxanes.

10. A process as recited in claim 9, further comprising the step of:
adding kaolin clay.

* * * * *